United States Patent [19]
Tachibana et al.

[11] Patent Number: 5,358,167
[45] Date of Patent: Oct. 25, 1994

[54] SOLDERING APPARATUS

[75] Inventors: Yoshiaki Tachibana, Yokohama; Kimihiko Nakamura, Tokyo; Masahito Nozue, Tokyo; Toshikazu Yasuoka, Tokyo; Masaru Kanazawa, Tokyo, all of Japan

[73] Assignees: Nihon Den-Netsu Keiki Co., Ltd.; Oki Electric Industry Co., Ltd., both of Japan

[21] Appl. No.: 158,884

[22] Filed: Nov. 29, 1993

[30] Foreign Application Priority Data

Nov. 30, 1992 [JP] Japan .................................. 4-320144
Dec. 16, 1992 [JP] Japan .................................. 4-353879

[51] Int. Cl.$^5$ .............................................. B23K 1/00
[52] U.S. Cl. ...................... 228/42; 219/388; 432/152
[58] Field of Search .................... 228/42, 43, 219; 219/388; 432/152

[56] References Cited

U.S. PATENT DOCUMENTS 5,147,083  9/1992  Halstead et al. ............. 228/42
5,230,460  7/1993  Deamborsio et al. ........ 228/42 X Primary Examiner—Kenneth J. Ramsey
Attorney, Agent, or Firm—Lorusso & Loud

[57] ABSTRACT

A soldering apparatus is disclosed which includes a longitudinally extending, air-tight housing having four contiguous, first through fourth zones and and inlet and outlet openings at both longitudinal ends thereof, a conveyer for conveying an article to be soldered along a predetermined path extending through the inlet opening, the first to fourth zones and the outlet opening, a soldering device provided in the second zone for applying a molten solder to the article traveling through the second zone, a plurality of upper and lower partition plates disposed in each of the first, third and fourth zones to partition each zone into a plurality of open ended chambers, an inert gas diffuser provided within at least one of the chambers of the third zone, and an air diffuser provided within at least one of the chambers of the fourth zone, so that the diffusion of air from the fourth zone to the third zone is substantially prevented while the diffusion of the inert gas from the third zone to the outlet opening through the fourth zone is reduced.

10 Claims, 6 Drawing Sheets

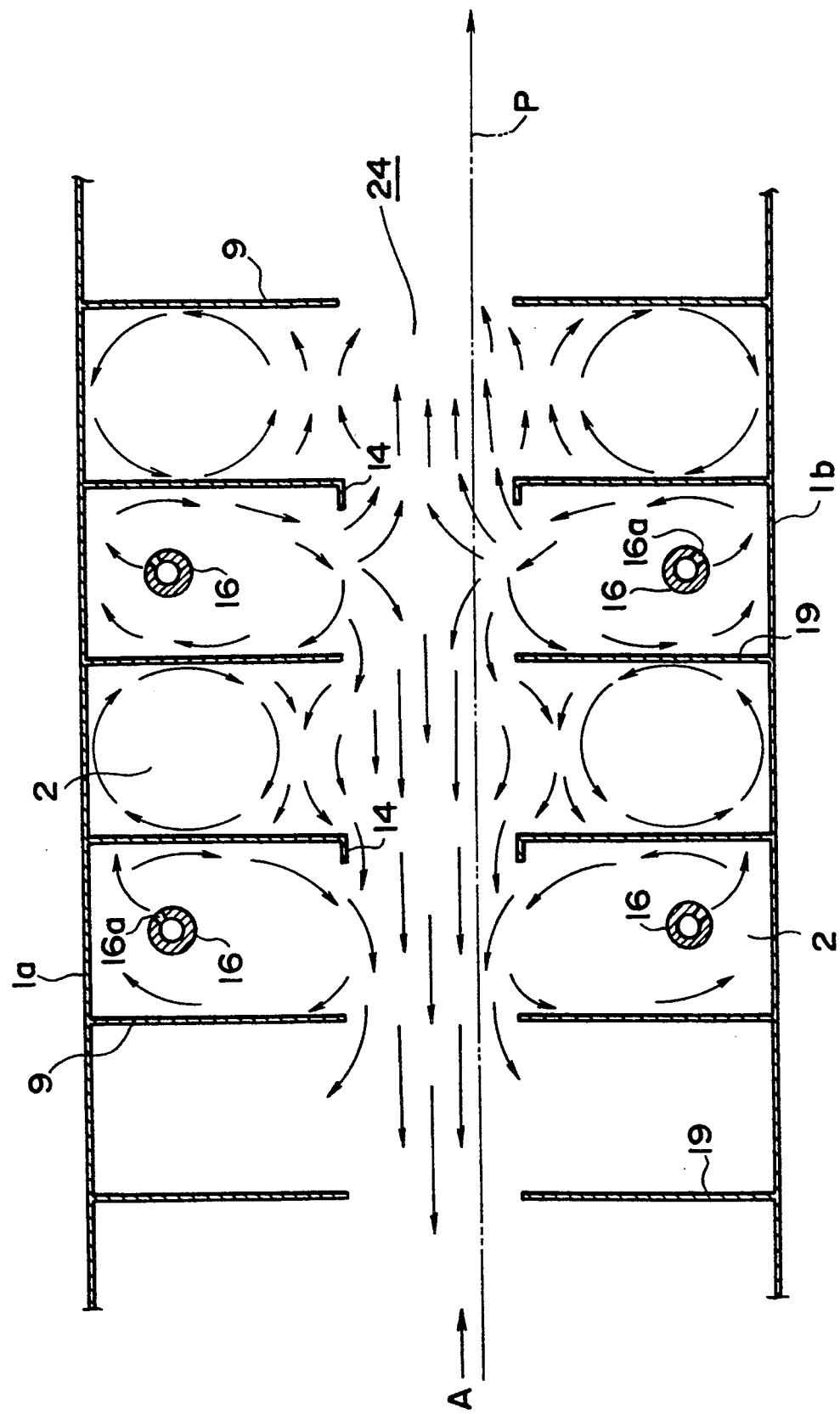

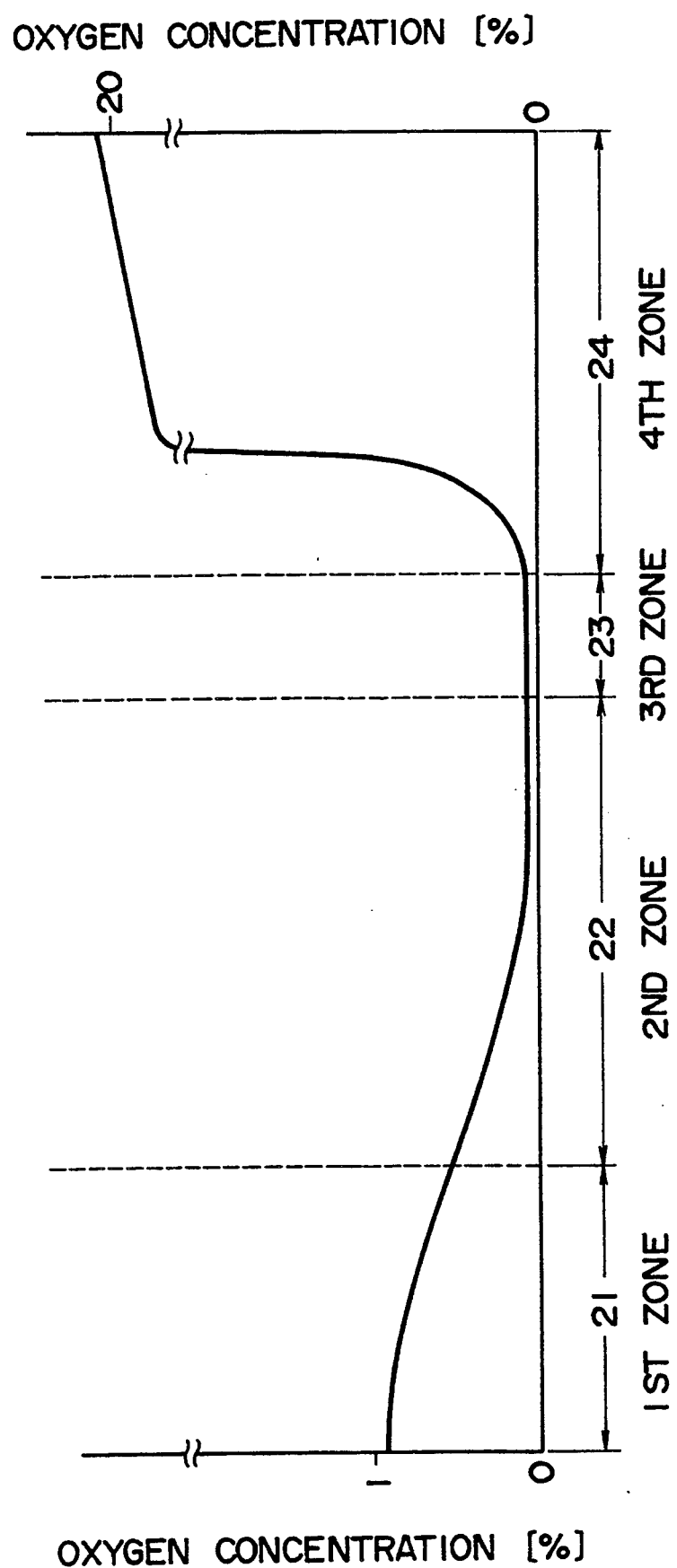

SOLDERING APPARATUS

BACKGROUND OF THE INVENTION

1. Field of the Invention

This invention relates generally to a soldering apparatus and, more specifically, to an apparatus for soldering an article, such as an electrical part-bearing printed wiring board, in an inert atmosphere.

2. Description of Prior Art

Because solder and metal portions to be soldered are susceptible to oxidation, it is desirable to perform a soldering operation in an inert gas atmosphere. JP-A-60-124464 discloses a soldering apparatus including a housing defining therein a soldering zone and having inlet and outlet openings positioned at positions lower than the soldering zone. An inert gas feeding port is provided in the top of the housing. The feeding port is connected to a source of the inert gas through a heater. Thus, the inert gas is heated in the heater and is fed to the top of the soldering zone. An article to be soldered is introduced through the inlet opening into the housing, conveyed upward to the soldering zone and, then, downward to the outlet opening. Since the soldering zone is positioned at a level higher than the inlet and outlet openings, the inert gas introduced into the soldering zone has a higher temperature (i.e. lower specific gravity) than the outside atmosphere, air is prevented from entering the soldering zone, so that the soldering operation can be performed in the inert gas atmosphere.

The known apparatus has, however, a drawback because it is necessary to provide a long vertical distance between the soldering zone and the inlet/outlet openings in order to prevent the outside air from entering the soldering zone. It is also necessary to slowly convey the article through the inside of the housing in order to suppress the creation of turbulent flows. Additionally, with the conventional apparatus, a large amount of the inert gas should be consumed to obtain satisfactory results.

SUMMARY OF THE INVENTION

It is, therefore, an object of the present invention to provide a soldering apparatus with which the soldering can be performed in an inert gas atmosphere with a very low oxygen content.

Another object of the present invention is to provide a soldering apparatus with which the consumption of the inert gas can be significantly saved.

It is a further object of the present invention to provide a compact apparatus which can perform the soldering operation with a high efficiency in an economical manner.

In accomplishing the foregoing objects, the present invention provides a soldering apparatus which includes:

a longitudinally extending, air-tight housing having a top wall, a bottom wall and inlet and outlet openings at both longitudinal ends thereof;

a first zone defined within the housing at a position adjacent to the inlet opening;

a fourth zone defined within the housing at a position adjacent to the outlet opening;

a second zone defined within the housing at a position between the first and fourth zones and contiguous to the first zone;

a third zone defined within the housing at a position between and contiguous to the second and fourth zones;

means for conveying an article to be soldered along a predetermined path extending through the inlet opening, the first to fourth zones and the outlet opening;

means provided in the second zone at a position adjacent to the boundary between the second and third zones for applying a molten solder to the article traveling through the second zone;

a plurality of upper and lower partition plates disposed in each of the first, third and fourth zones to partition each zone into a plurality of open ended chambers, each of the upper plates extending downward from the top wall, each of the lower plates extending upward from the bottom wall, and each of the upper and lower plates terminating so as not to interfere with the path;

means provided within at least one of the chambers of the third zone for diffusing a first, inert gas thereinto so that the inert gas diffuses into each of the first, second and fourth zones with the partition plates serving to minimize turbulent flows of the inert gas; and means provided within at least one of the chambers of the fourth zone for diffusing a second gas thereinto such that the diffusion of the second gas from the fourth zone to the third zone is substantially prevented while the diffusion of the inert gas from the third zone to the outlet opening through the fourth zone is reduced. As a consequence of the above construction, the article to be soldered is passed successively through the inlet opening, first to fourth zones and outlet opening and is soldered during passage through the second zone in the atmosphere of the inert gas.

The present invention also provides a soldering apparatus which includes:

a longitudinally extending, air-tight housing having inlet and outlet openings at both longitudinal ends thereof;

a first zone defined within the housing at a position adjacent to the inlet opening;

a fourth zone defined within the housing at a position adjacent to the outlet opening;

a second zone defined within the housing at a position between the first and fourth zones and contiguous to the first zone;

a third zone defined within the housing at a position between and contiguous to the second and fourth zones;

means for conveying an article to be soldered along a predetermined path extending through the inlet opening, the first to fourth zones and the outlet opening;

means provided in the second zone at a position adjacent to the boundary between the second and third zones for applying a molten solder to the article traveling through the second zone;

a plurality of partition plates disposed in each of the first, third and fourth zones to partition each zone into a plurality of chambers, each of said plates having an opening so that each of the adjacent two chambers are in fluid communication with each other only through said opening, each of said openings being arranged so as to permit the article traveling through said path to pass therethrough;

means provided within at least one of the chambers of the third zone for diffusing a first, inert gas thereinto so that the inert gas diffuses into each of the first, second and fourth zones with the partition plates serving to minimize turbulent flows of the inert gas; and means provided within at least one of the chambers of the fourth zone for diffusing a second gas thereinto such that the diffusion of the second gas from the fourth zone to the third zone is substantially prevented while the diffusion of the inert gas from the third zone to the outlet opening through the fourth zone is reduced.

BRIEF DESCRIPTION OF THE DRAWINGS

Other objects, features and advantages of the present invention will become apparent from the detailed description of the invention which follows, when considered in light of the accompanying drawings in which:

FIG. 5 is an enlarged partial view showing a fourth zone of the soldering apparatus of FIG. 1;

FIG. 6 is a diagram showing the oxygen content within the first through fourth zones of the apparatus of FIG. 1.

DETAILED DESCRIPTION OF THE PREFERRED EMBODIMENTS OF THE INVENTION

Figure 1:
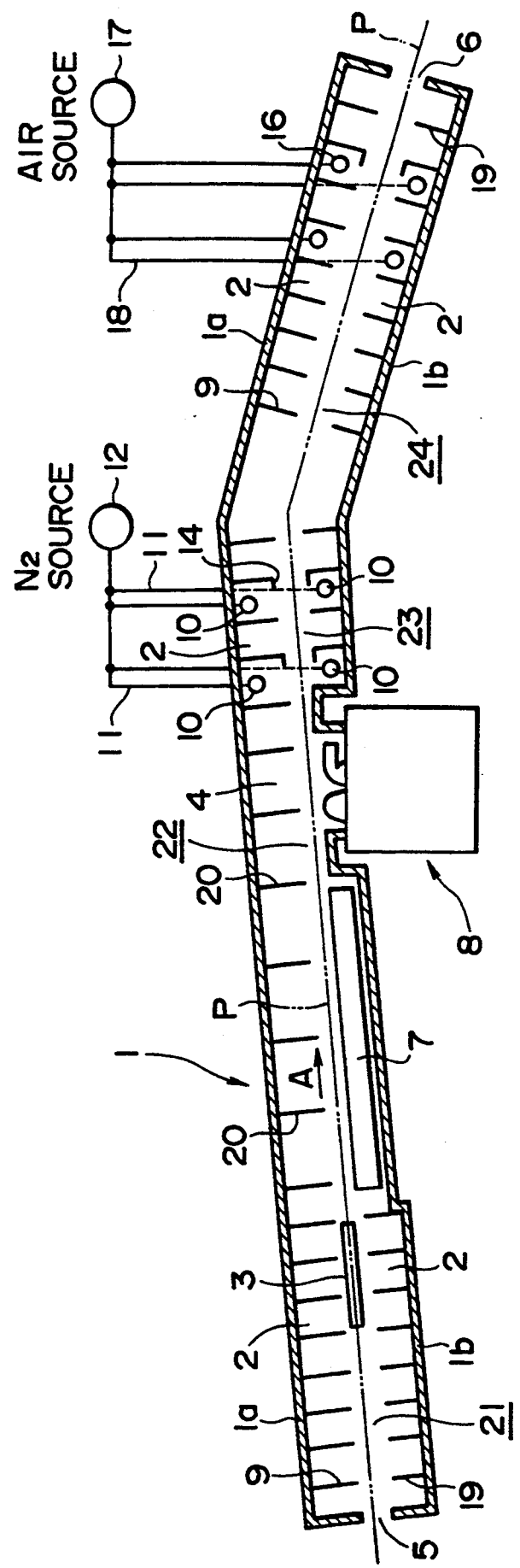
FIG. 1 is a cross-sectional, elevational view diagrammatically showing one embodiment of a soldering apparatus according to the present invention.

Referring now to FIG. 1, the reference numeral 1 denotes a longitudinally extending, air-tight housing having a top wall 1a, a bottom wall 1b and inlet and outlet openings 5 and 6 at both longitudinal ends thereof.

Defined within the housing 1 are four, contiguous, first through fourth zones 21–24. The first zone 21 is positioned adjacent to the inlet opening 5, while the fourth zone 24 is located adjacent to the outlet opening 6. The second and third zones 22 and 23 are defined between the first and fourth zones 21 and 24.

Conveying means (not shown), such as a conveyer chain, is disposed within the housing 1 for conveying an article 3 to be soldered along a predetermined path P. The path P extends through the inlet opening 5, the first to fourth zones 21–24 and the outlet opening 6.

Soldering means 8, such as a wave soldering device, is provided in the second zone 22 at a position adjacent to the boundary between the second and third zones 22 and 23 for applying a molten solder to the article 3 traveling above the soldering device 8. Any conventionally known soldering device may be used for the purpose of the present invention. Designated as 7 is a preheater disposed in the second zone 22 at a position upstream of the soldering device 8 for preheating the article 3 traveling thereabove. Since the article 3 is preferably displaced in a slightly inclined state, that portion of the housing 1 corresponding to at least the second zone 22 (the first to third zones 21–23 in the illustrated case) is also preferably inclined.

A plurality of upper and lower partition plates 9 and 19 are provided in each of the first, third and fourth zones 21, 23 and 24 to partition each zone into a plurality of open ended chambers 2. Each of the upper plates 9 extends downward from the top wall 1a, while each of the lower plates 19 extends upward from the bottom wall 1b, with each of the upper and lower plates 9 and 19 terminating so as not to interfere with the path P along which the article 3 travels. It is preferred but not essential that the upper and the lower plates 9 and 19 be vertically aligned as illustrated. The upper and/or lower plates 9 and 19 can be extended to left and right sides of the path P as long as such side extensions do not interfere with the path P. When respective upper plates are vertically aligned as illustrated, it is possible that each pair of vertically aligned upper and lower plates are shaped into a single plate provided with an opening for the passage P.

At least one of the chambers 2 (four chambers in the illustrated embodiment) of the third zone 23 is provided with a diffuser 10 for continuously feeding a first, inert gas, such as nitrogen, into the chamber 2. Each of the diffusers 10 is connected to a source of the inert gas 12 through a pipe 11. A flow rate control means (not shown) is preferably disposed in each pipe 11 to adjust the feed rate of the inert gas. The inert gas discharged from the diffuser 10 diffuses successively into neighboring chambers 2 with the partition plates 19 and 20 serving to minimize turbulent flows of the inert gas.

Figure 2:
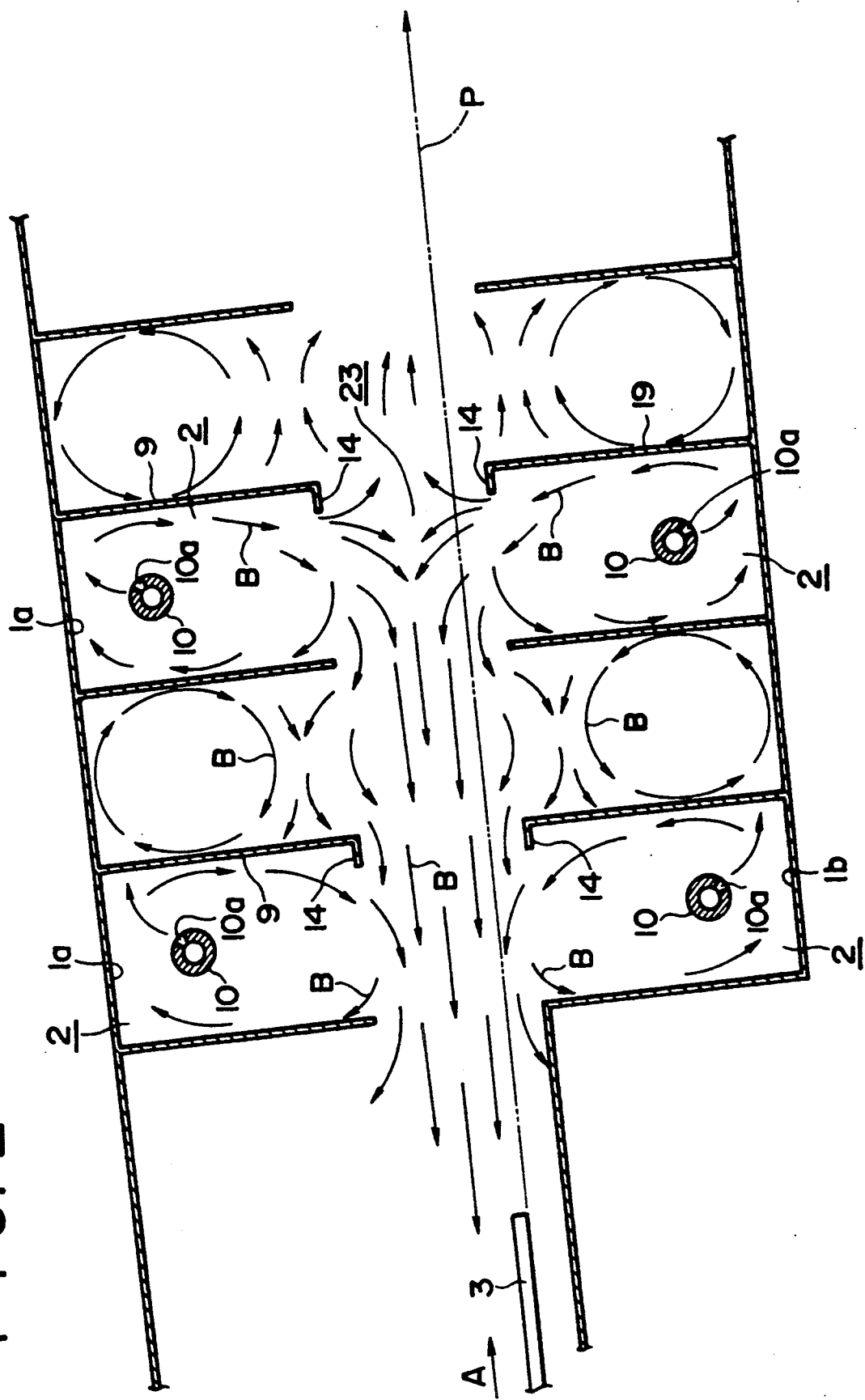
FIG. 2 is an enlarged partial view showing a third zone of the soldering apparatus of FIG. 1.
Figure 3:
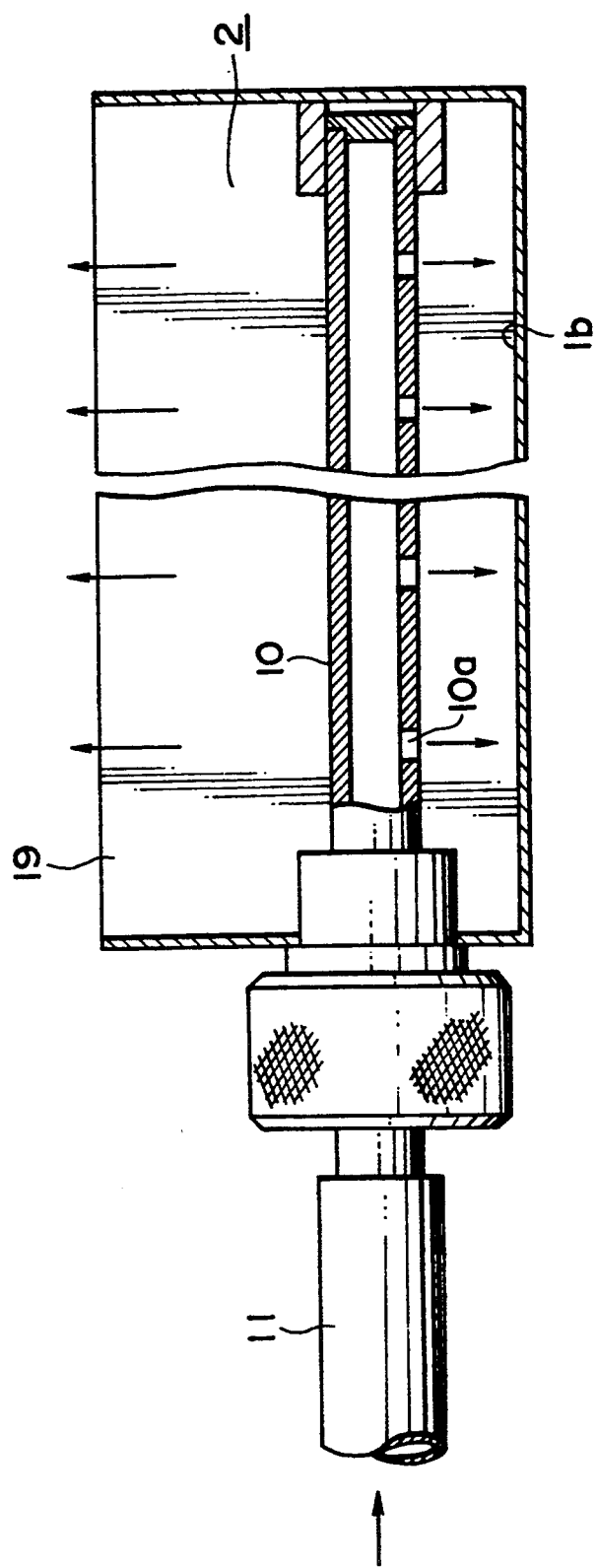
FIG. 3 is a sectional view of a diffuser of FIG. 2.

More particularly, as shown in FIG. 3, the diffuser 10 in this embodiment is a laterally extending pipe having a plurality of axially arrayed openings 10a for projecting a linear jet of the inert gas therefrom. One end of the diffuser pipe 10 is connected to the feed pipe 11 while the other end thereof is closed. As shown in FIG. 2, each of the openings 10a is oriented obliquely toward the top or bottom wall 1a or 1b so that the flow direction of the inert gas created in that chamber 2 in which the diffuser 10 is disposed is mainly as indicated by the arrow B. Namely, the flow direction is such as to facilitate the diffusion of the inert gas in the direction opposite the conveying direction (direction of the arrow A) of the article. Preferably, one or more pairs of upper and lower diffusers 10 be disposed above and beneath the path P, respectively, for reasons of uniformity of the inert gas flows.

It is preferred that the partition plate 9 or 19 located immediately downstream of each of the diffusers 10 have a bent end portion 14 so as to facilitate the flow of the diffusing inert gas in the direction opposite the conveying direction of the article. In the illustrated embodiment, the bending angle of the end portion 14 is about 90 degrees. This angle may be varied in the range of 10–90 degrees.

Figure 4:
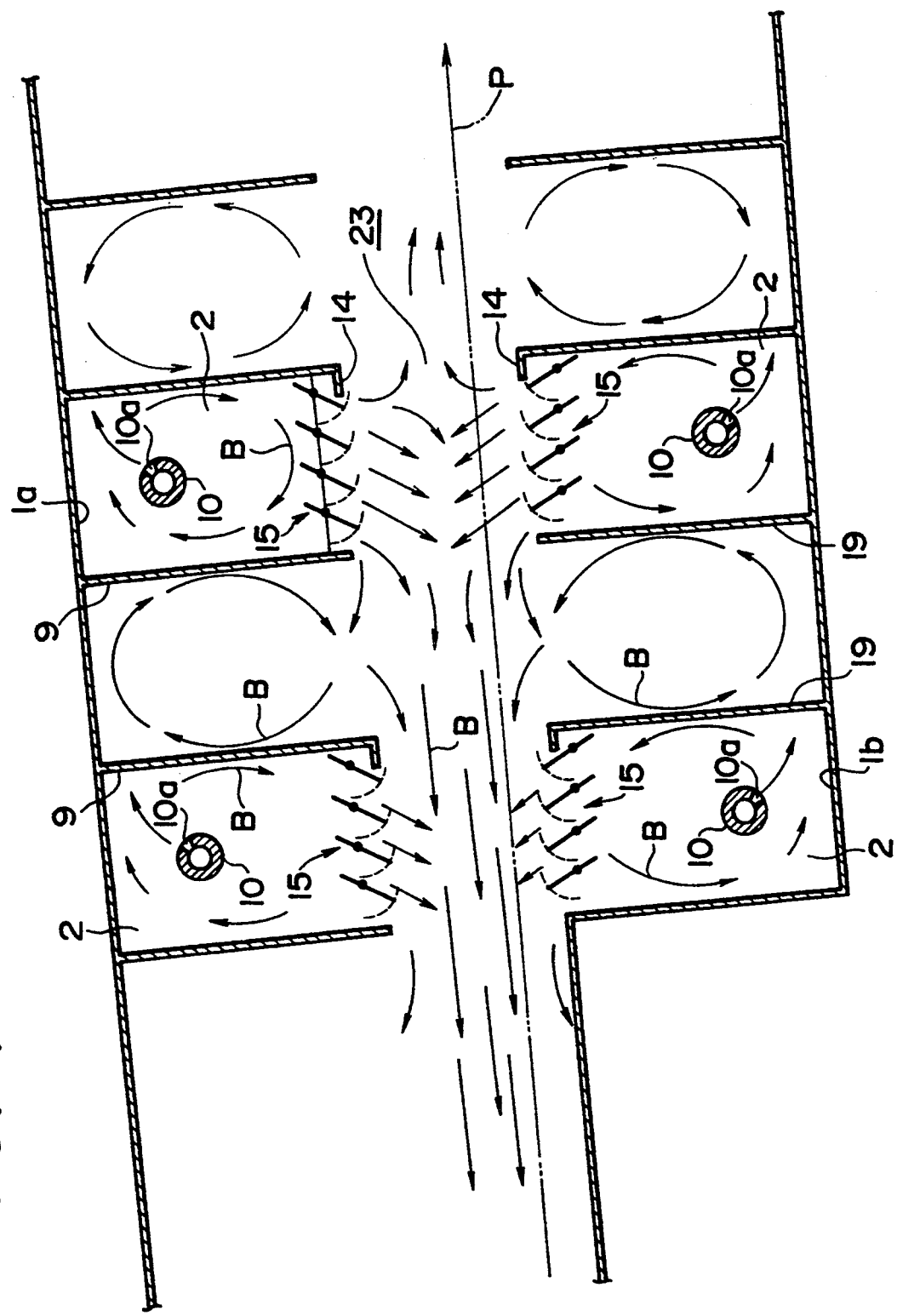
FIG. 4 is an enlarged partial view, similar to FIG. 2, showing an alternate embodiment.

FIG. 4 illustrates a modification of the embodiment of FIG. 2. In this embodiment, flow control means 15 is disposed adjacent to the open end of each of the chambers 2 in which the inert gas diffuser 10 is accommodated. The flow control means 15 includes a plurality of spaced apart plates oriented so that a majority of the inert gas discharged from the chamber 2 is directed opposite the conveying direction of the article. Each of the flow control plates is preferably constructed so that the orientation angle thereof is adjustable to obtain an optimum result. The preferable flow of the gas in the third zone 23 is schematically shown by the arrows B in FIGS. 2 and 4.

Referring again to FIG. 1, at least one chamber 2 (four chambers in the illustrated embodiment) of the fourth zone 24 is provided with a diffuser 16 for continuously feeding a second gas, such as air or nitrogen, into the chamber 2. Each of the diffusers 16 is connected to a source of the second gas (such as an air blower) 17 through a pipe 18. A flow rate control means (not shown) is preferably disposed in each pipe 11 to adjust the feed rate of the second gas. The second gas discharged from the diffuser 16 diffuses successively into neighboring chambers 2 with the partition plates 19 and 20 serving to minimize turbulent flows of the inert gas. By feeding the second gas to the fourth zone 24 in a suitable flow rate, the diffusion of the inert gas from the third zone 23 to the outlet opening 6 through the fourth zone 24 can be reduced, while the diffusion of the second gas from the fourth zone 24 to the third zone 23 can be minimized.

As shown in FIG. 5, the fourth zone 24 has a construction similar to that of the third zone 23. Thus, the structure and arrangement of the diffuser 16 may be the same as the diffuser 10 shown in FIG. 3 so as to facilitate the diffusion of the second gas in the direction opposite the conveying direction of the article 3. Preferably, the partition plate 9 or 19 located immediately downstream of each of the second gas diffusing means has a bent end portion 14 and a direction control means (not shown) similar to that of 15 in FIG. 4 may be disposed adjacent to the open end of that chamber 2 in which the second gas diffuser 16 is disposed.

As shown in FIG. 1, the second zone 22 is preferably also provided with a plurality of baffle plates 20 each extending downward from the top wall 1a and terminating so as not to interfere with the path P. Thus, in the second zone 22 a plurality of open ended chambers 4 are defined so that the occurrence of turbulent flow in the second zone is minimized even though there are caused rising gas currents because of the presence of the soldering device 8 and the preheater 7.

Operation of the thus constructed soldering apparatus will be described below.

Before start of the soldering operation, the inert gas is fed to the third zone 23 without feeding the second gas to the fourth zone 24. After the air within the housing 1 has been replaced by the inert gas, the feeding of the second gas is started.

The article to be soldered 3 conveyed through the path P in the direction of the arrow A is first treated in a fluxer (not shown) and is then passed through the inlet opening 5 and introduced into the first zone 21. During its passage through the second zone 22, the article 3 is preheated with the heater 7 and is then applied with a molten solder by contact with the solder wave in the soldering device 8 in the atmosphere of the inert gas, i.e. in a substantially oxygen-free (for example, less than 0.01%). The soldered article is then transferred to the third and fourth zone 23 and 24 and is discharged from the housing 1 through the outlet opening 6.

Since the pressure within the housing 1 is higher than the ambient pressure due to the feeding of the first and second gases and since the partition plates 9 and 19 serve to form a laminar flow, outside air is prevented from entering the first chamber 21 through the inlet opening 5. In the second zone 22, the laminar flow of the inert gas introduced from the third zone 23 is disturbed by the convection due to the presence of the preheater 7 and the molten solder of the soldering device 8. The turbulent flow is however reduced because of the presence of the baffle plates 20.

The conviction also cause the inert gas in the second chamber to flow from the second zone to the third zone when the third zone 23 is located at a level higher than that of the second zone 22. Such a back flow can be blocked by the inert gas flow in the third chamber which is mainly directed in the direction opposite the back flow. Part of the inert gas in the third zone 23 is diffused into the fourth zone 24. However, the feeding of the second gas through the diffusers 16 can prevent the passage of the inert gas through the fourth zone to the outlet opening 6.

FIG. 6 schematically illustrate an example of the oxygen concentration pattern within the housing in the case where air is used as the second gas. In the outlet opening 6, the oxygen concentration is equal to that of air (about 20%). In the second zone 22, the oxygen concentration may be maintained below 0.01% (100 ppm). The oxygen concentration gradually increases toward the inlet opening 5 up to about 1%. The apparatus of the present invention can provide such an advantageous pattern even with a reduced amount of the inert gas feed.

For example, with the apparatus shown in FIG. 1, when air is fed to the fourth zone 24 in an amount of 80 liters per minute, it is necessary to feed 140 liters per minute of nitrogen to the third zone 23 in order to maintain the oxygen content in the mid point of the second zone 22 at 100 ppm. When no air is fed to the fourth zone 24, the amount of nitrogen fed to the third zone 23 must be increased 200 liters per minute for obtaining the same result. In this case, if the upper and lower partition plates are removed, a much larger amount of nitrogen will be required.

If desired, one or more second gas diffusers similar to those 16 used in the fourth zone 24 may be disposed in the first zone 21. By this, the amount of the inert gas fed to the third zone can be further reduced.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A soldering apparatus comprising:

a longitudinally extending, air-tight housing having a top wall, a bottom wall and inlet and outlet openings at both longitudinal ends thereof;

a first zone defined within said housing at a position adjacent to said inlet opening;

a fourth zone defined within said housing at a position adjacent to said outlet opening;

a second zone defined within said housing at a position between said first and fourth zones and contiguous to said first zone;

a third zone defined within said housing at a position between and contiguous to said second and fourth zones;

means for conveying an article to be soldered along a predetermined path extending through said inlet opening, said first to fourth zones and said outlet opening;

means provided in said second zone at a position adjacent to the boundary between said second and third zones for applying a molten solder to the article traveling through said second zone;

a plurality of upper and lower partition plates disposed in each of said first, third and fourth zones to partition each zone into a plurality of open ended chambers, each of said upper plates extending downward from said top wall, each of said lower plates extending upward from said bottom wall, and each of said upper and lower plates terminating so as not to interfere with said path;

means provided within at least one of said chambers of said third zone for diffusing a first, inert gas thereinto so that the inert gas diffuses into each of said first, second and fourth zones with said partition plates serving to minimize turbulent flows of the inert gas; and means provided within at least one of said chambers of said fourth zone for diffusing a second gas thereinto such that the diffusion of the second gas from the fourth zone to said third zone is substantially prevented while the diffusion of the inert gas from said third zone to said outlet opening through said fourth zone is reduced, whereby the article to be soldered is passed successively through said inlet opening, first to fourth zones and outlet opening and is soldered during passage through said second zone in the atmosphere of the inert gas.

2. A soldering apparatus as claimed in claim 1, wherein the partition plate located immediately downstream of said inert gas diffusing means has a bent end portion so that a major part of the inert gas discharged from that chamber in which said inert gas diffusing means is disposed flows in the direction opposite the conveying direction of the article.

3. A soldering apparatus as claimed in claim 1, wherein the partition plate located immediately downstream of said second gas diffusing means has a bent end portion so that a major part of the second gas discharged from that chamber in which said second gas diffusing means is disposed flows in the direction opposite the conveying direction of the article.

4. A soldering apparatus as claimed in claim 1, wherein said inert gas diffusing means includes a laterally extending pipe having a plurality of axially arrayed openings for projecting a linear jet of the inert gas therefrom in a direction so that the flow of the inert gas created in that chamber in which said inert gas diffusing means is disposed can facilitate the diffusion of said inert gas in the direction opposite the conveying direction of the article.

5. A soldering apparatus as claimed in claim 1, wherein said second gas diffusing means includes a laterally extending pipe having a plurality of axially arrayed openings for projecting a linear jet of the second gas therefrom in a direction so that the flow of the second gas created in that chamber in which said second gas diffusing means is disposed can facilitate the diffusion of said second gas in the direction opposite the conveying direction of the article.

6. A soldering apparatus as claimed in claim 1, further comprising a preheater disposed in said second zone at a position upstream of said molten solder applying means for preheating the article traveling in said second zone.

7. A soldering apparatus as claimed in claim 1, further comprising flow control means disposed adjacent to the open end of that chamber in which said inert gas diffusing means is disposed for directing the inert gas diffused therefrom in the direction opposite the conveying direction of the article.

8. A soldering apparatus as claimed in claim 1, further comprising direction control means disposed adjacent to the open end of that chamber in which said second gas diffusing means is disposed for directing the second gas diffused therefrom in the direction opposite the conveying direction of the article.

9. A soldering apparatus as claimed in claim 1, further comprising a plurality of baffle plates each extending downward from said top wall and disposed in said second zone to partition said second zone into a plurality of open ended chambers, each of said baffle plates terminating so as not to interfere with said path.

10. A soldering apparatus which includes:
a longitudinally extending, air-tight housing having inlet and outlet openings at both longitudinal ends thereof;
a first zone defined within the housing at a position adjacent to the inlet opening;
a fourth zone defined within the housing at a position adjacent to the outlet opening;
a second zone defined within the housing at a position between the first and fourth zones and contiguous to the first zone;
a third zone defined within the housing at a position between and contiguous to the second and fourth zones;
means for conveying an article to be soldered along a predetermined path extending through the inlet opening, the first to fourth zones and the outlet opening;
means provided in the second zone at a position adjacent to the boundary between the second and third zones for applying a molten solder to the article traveling through the second zone;
a plurality of partition plates disposed in each of the first, third and fourth zones to partition each zone into a plurality of chambers, each of said plates having an opening so that each of the adjacent two chambers are in fluid communication with each other only through said opening, each of said openings being arranged so as to permit the passage of the article therethrough;
means provided within at least one of the chambers of the third zone for diffusing a first, inert gas thereinto so that the inert gas diffuses into each of the first, second and fourth zones with the partition plates serving to minimize turbulent flows of the inert gas; and
means provided within at least one of the chambers of the fourth zone for diffusing a second gas thereinto such that the diffusion of the second gas from the fourth zone to the third zone is substantially prevented while the diffusion of the inert gas from the third zone to the outlet opening through the fourth zone is reduced,
whereby the article to be soldered is passed successively through said inlet opening, first to fourth zones and outlet opening and is soldered during passage through said second zone in the atmosphere of the inert gas.

* * * * *